Patented Jan. 16, 1951

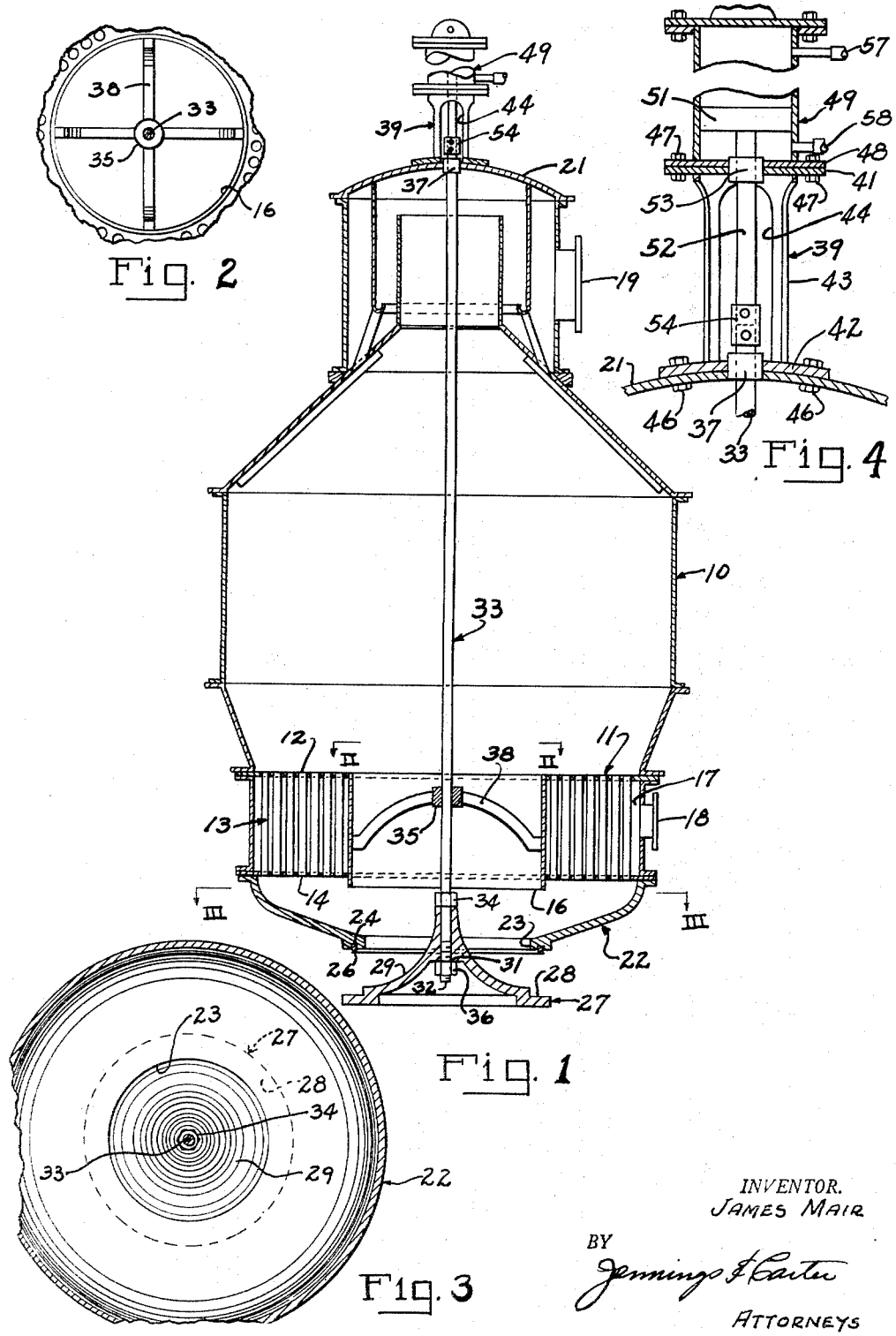

2,538,113

UNITED STATES PATENT OFFICE 2,538,113

DUMP BOTTOM FOR CALANDRIA VACUUM PANS

James Mair, Birmingham, Ala., assignor to Goslin-Birmingham Manufacturing Company, Inc., a corporation of Alabama Application March 22, 1948, Serial No. 16,163

4 Claims. (Cl. 159—43)

My present invention relates to evaporators, especially calandria vacuum pans, and more particularly to mechanism for dumping the contents of such apparatus.

In the art to which my invention relates, calandria vacuum pans have heretofore been provided with openings disposed in various ways in the bottom through which the contents of the pan were dumped when necessary. These openings were sealed by individual closures known in the art as strike valves. Some such closures have heretofore been supported for movement toward and from the opening by means of pivoted links, arranged to compound the motion of a manually operated hand wheel, in an effort to effect quick dumping of the contents of the pan. The bottoms of such pans have likewise been provided with a stream flow baffle, upturned at its periphery to aid the upward return flow through the tubes of material being cooked. In prior constructions this baffle has impeded the discharge of material from the bottom opening when dumping because the material had to flow around the periphery of the baffle before reaching the opening. In addition, the upturned peripheral portion of such a baffle acts as a trap to retain a relatively large quantity of material in the pan when the strike valve is opened. Complete dumping of such pans has heretofore been unobtainable, with the result that a portion of the capacity of the pan was lost. The arrangement of the linkage and operating mechanism for the strike valve has been expensive, slow in operation, and generally unsatisfactory. The strike valves have been supported for movement in such manner that they do not move vertically from open to closed position.

It is a prime object of my invention, therefore, to overcome the above difficulties and provide a vacuum pan in which the usual strike valve together with the complicated mechanism for actuating the same is eliminated, and to substitute therefor a movable closure for a single, relatively large opening in the bottom of the pan by means of which the contents may be quickly and completely dumped.

Another object is to provide apparatus of the character designated in which a single relatively large opening is provided in the bottom of the pan, and to provide the closure or cover therefor with a circular, concave baffle, hereinafter referred to as a stream flow baffle, whereby all of the advantages of similar baffles in aiding the flow of material being cooked are maintained, but at the same time eliminating the disadvantages of the same with respect to dumping the pan.

A further object is to provide a pressure cylinder mounted on top of the pan for moving the closure to open and closed position, and to mount the cylinder in such a manner that the packing glands thereof are accessible for adjustment or replacement without removing the cylinder.

Apparatus embodying the features of my invention is illustrated in the accompanying drawings forming a part of this application in which—

Fig. 1 is a somewhat diagrammatic vertical sectional view through a calandria vacuum pan and showing my improved dumping mechanism associated therewith;

Fig. 2 is a detail sectional view taken along the line II—II of Fig. 1;

Fig. 3 is a detail sectional view taken along the line III—III of Fig. 1; and,

Fig. 4 is an enlarged sectional view through the pressure cylinder and support therefor at the top of the vacuum pan.

Referring now to the drawings for a better understanding of my invention, I show the same in association with a well known form of calandria vacuum pan embodying the vertically disposed body 10 and a calandria 11 at the bottom thereof. The calandria comprises an upper tube sheet 12, a tube nest 13, and a lower tube sheet 14. A down take well 16 is provided in the usual manner at the center of the tube nest. A steam chest 17 surrounds the tube nest and is provided with the conventional steam inlet 18. The vapor head at the top of the body has a vapor outlet 19 and the usual catch-all is provided in the vapor head. The top of the body is closed by means of a cover 21.

In accordance with my invention, I provide the bottom 22 of the vessel with a single centrally disposed opening 23. As shown in Fig. 1, this opening is relatively large whereby the contents of the vacuum pan may readily flow therefrom when the same is opened. Around the periphery of the opening 23 I provide a dovetail groove 24, and place in the groove a gasket 26.

Adapted to cooperate with the gasket 26 in sealing the opening 23 is a closure 27. The closure comprises the peripheral flange portion 28 disposed to contact the gasket 26, and the centrally disposed concave portion 29, similar to the stream flow baffle already known except that the upturned peripheral portion is omitted. The closure is drilled at its center as indicated at 31 to receive the threaded lower end 32 of a vertically disposed pull rod 33, and is secured to the rod 33 by means of upper and lower nuts 34 and 36.

The rod 33 passes upwardly through the axial center of the body 10 and through a suitable packing gland 37 in the top cover 21. The rod 33 is guided adjacent its lower end by means of a bearing 35 formed in the center of a spider 34 and which may be mounted in any suitable manner in the downtake well 16. Mounted on top of the cover 21 is a support member 39. The member 39 comprises upper and lower flanges 41 and 42, respectively, joined by any suitable means as by welding to a central portion 43 having openings 44 therein. The member 39 is secured to the cover 21 by means of nuts and bolts 46.

Mounted on top of the flange 41 by means of nuts and bolts 47 is the lower flange 48 of a pressure cylinder 49. The cylinder 49 embodies the usual piston 51 and piston rod 52, the latter passing through a packing gland 53 at the lower end of the cylinder. The outer end of the piston rod 52 is joined to the pull rod 33 by means of a sleeve coupling 54. The piston 51 is double acting, suitable conduits 57 and 58 being provided for the selective admission and return of fluid under pressure to either end of the cylinder.

From the foregoing the method of constructing and operating my improved dump mechanism will be readily understood. When it is desired to dump material from the vacuum pan, fluid is admitted to the cylinder 49 through the upper conduit 57 and simultaneously the conduit 58 is opened to permit fluid beneath piston 51 to flow therethrough. It will be apparent that the closure 27 is moved positively and swiftly downward, uncovering the discharge opening 23 in the bottom and permitting the contents to flow out. Conversely, with the closure in the open position, as shown in Fig. 1 of the drawing, to close the same it is only necessary to admit fluid to the lower conduit 58 to force the piston 51 upwardly.

It is to be noted that the stream flow baffle portion 29 of the member 27 offers no resistance to the flow of a material out of the opening 23 when the closure is in the position shown in Fig. 1. When lowered, material spills out around the entire periphery of the closure instead of having to flow around the bottom to a small opening as has heretofore been the case. I have found that eliminating the upturned peripheral portion of the baffle does not adversely affect the stream line flow of materials when the pan is in operation. With the closure 27 in closed position the baffle portion 29 thereof serves to cause the liquid coming down the downtake well 16 to be deflected outwardly from the center of the body and upwardly through the tube nest, thence to spill over again into the downtake well. By this construction I take advantage of the well known baffle principle of aiding the flow, but instead of securing the baffle to the bottom of the pan where it interferes with the dumping thereof, I form the same on the movable closure where it does not interfere with dumping.

The openings 44 of support 39 for the hydraulic cylinder permit an operator to tighten the packing glands 37 and 53 or to replace the same. Likewise, it is possible to loosen the sleeve coupling 54 through openings 44 in the event it is desired to remove the cover 21 or the hydraulic cylinder 49 without the necessity of having to withdraw the entire rod 33. Likewise, it will be apparent that the closure 27 may be held in closed position by temporary means, thereby to permit the cylinder 49 to be entirely removed for repair or replacement without putting the pan out of operation.

From the foregoing it will be apparent that I have devised an improved dump mechanism for evaporators which is positive in operation, and in which a complete dumping of the material is obtained. It will be understood that the purpose of the curved portion 29 carried by the closure is the same as the stationary baffle heretofore placed in the bottom of prior apparatus. It positively deflects the down coming material from the downtake well radially outwardly from the center of the calandria so that the same circulates upwardly through the tubes. However, by mounting such a baffle to move with the closure it interferes in no way with the dumping of the material through the main discharge opening.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a calandria vacuum pan embodying a vertically disposed body with the calandria adjacent the bottom thereof, a centrally disposed opening in the bottom of the body, a closure for the opening having a stream flow baffle on its upper surface to direct downwardly moving material outwardly from the center of the body, a vertically disposed rod connected at its lower end to the center of the closure and with its upper end projecting through the top of the body, a pressure cylinder embodying a piston rod, disengageable means connecting the piston rod to the projecting end of the vertical rod, and means mounting the cylinder in spaced relation to the top of body and affording access to the means connecting the piston rod and vertical rod.

2. In a calandria vacuum pan comprising a vertically disposed body with the calandria adjacent the lower end of the body, said body having a centrally disposed opening in the lower end thereof and a vertically disposed pressure cylinder at the top of the body embodying a double acting piston carrying a piston rod slidable through a packing gland in the lower end of the cylinder, the improvements which comprise a closure for the opening having a concave baffle on its upper surface disposed to direct downwardly moving material outwardly from the center of the body, a vertically disposed rod connected at its lower end to the closure with its upper end projecting through the top of the body, a packing gland mounted on the top of the body through which the upper end of the vertical rod passes, a vertically elongated mounting on top of the body surrounding the projecting upper end of said vertically disposed rod, means securing the pressure cylinder to the top of the mounting with the piston rod thereof projecting downwardly from the cylinder, a coupling connecting the end of the piston rod to the projecting end of the vertical rod at a point between the lower end of the cylinder and the upper end of the body, there being openings in the mounting whereby the said coupling and the packing glands at the top of the body and the lower end of the cylinder are accessible, and means to admit fluid under pressure to opposite sides of the piston.

3. In an evaporator comprising a body with a calandria adjacent the lower end thereof having a centrally disposed downtake well together with a downwardly dished bottom for the body beneath the calandria and a pressure cylinder embodying a double acting piston and a downwardly extending piston rod, the improvements comprising a single relatively large circular opening in the center of the bottom through which the contents of the evaporator are dumped, a circular closure for the opening embodying an upper surface disposed to direct downwardly moving materials from the well outwardly from the center of the bottom, a rod connected at its lower end to the top of the closure at the center thereof, a packing gland in the top of the body beneath the cylinder, the upper end of said rod passing through the packing gland and projecting above the top of the body, framework supporting the cylinder in spaced relation over the top of the body and with the piston rod thereof in alignment with the projecting end of said vertical rod, there being openings in the sides of said supporting framework through which said packing gland is accessible, a coupling connecting the piston rod to the projecting end of said rod, and means to supply fluid under pressure to either side of the piston.

4. Apparatus as defined in claim 3 in which the coupling is of the sleeve type, and in which the projecting end of the vertical rod is free to slide downwardly completely out of the packing gland when the coupling is disengaged therefrom.

JAMES MAIR.

REFERENCES CITED

The following references are of record in the file of this patent:

UNITED STATES PATENTS

| Number | Name | Date |
|---|---|---|
| 743,352 | Trump | Nov. 3, 1903 |
| 1,558,957 | White | Oct. 27, 1925 |
| 2,241,294 | Carreras et al. | May 6, 1941 |
| 2,326,619 | Carreras | Aug. 10, 1943 |

FOREIGN PATENTS

| Number | Country | Date |
|---|---|---|
| 56,668 | Norway | June 15, 1936 |